United States Patent [19]

Law et al.

[11] Patent Number: 5,175,258
[45] Date of Patent: Dec. 29, 1992

[54] PROCESSES FOR THE PREPARATION OF BISAZO PHOTOGENERATING PIGMENTS USING AN ANNEALING STEP

[75] Inventors: Kock-Yee Law, Penfield; Ihor W. Tarnawskyj, Rochester, both of N.Y.

[73] Assignee: Xerox Corporation, Stamford, Conn.

[21] Appl. No.: 627,800

[22] Filed: Dec. 14, 1990

[51] Int. Cl.$^5$ .................... C09B 35/03; C09B 35/039; C09B 67/54
[52] U.S. Cl. .................... 534/581; 106/496; 430/57; 430/58; 534/561; 534/563; 534/565; 534/575; 534/655; 534/658; 534/751; 534/821; 534/829; 534/887
[58] Field of Search .............. 534/757, 821, 829, 575, 534/887, 581, 655, 658; 106/496

[56] References Cited

U.S. PATENT DOCUMENTS

| | | | |
|---|---|---|---|
| 4,065,449 | 12/1977 | Cseh | 534/887 X |
| 4,299,896 | 11/1981 | Hashimoto et al. | 430/58 |
| 4,314,015 | 2/1982 | Hashimoto et al. | 430/58 |
| 4,327,999 | 5/1982 | Koller et al. | 534/575 |
| 4,388,078 | 6/1983 | Thomas et al. | 534/575 |
| 4,666,810 | 5/1987 | Umehara et al. | 430/71 |
| 4,916,039 | 4/1990 | Hashimoto et al. | 430/57 |
| 4,925,758 | 5/1990 | Hashimoto et al. | 430/57 |
| 4,960,435 | 10/1990 | Tunoda et al. | 534/575 |

*Primary Examiner*—Floyd D. Higel
*Attorney, Agent, or Firm*—E. O. Palazzo

[57] ABSTRACT

A process for the preparation of photogenerating pigments which comprises the reaction of a diaminofluorenone with an alkali nitrite, an acid, and a tetrafluoroborate; thereafter reacting the resulting product with an anilide coupler; and subsequently annealing the product obtained.

26 Claims, 1 Drawing Sheet

PROCESSES FOR THE PREPARATION OF BISAZO PHOTOGENERATING PIGMENTS USING AN ANNEALING STEP

BACKGROUND OF THE INVENTION

This invention is generally directed to processes for the preparation of photogenerating compositions, and more specifically, the present invention is directed to bisazo photogenerating pigments prepared by annealing methods. In one embodiment of the present invention there are provided economical processes for the preparation of bisazo photogenerating pigments by the reaction of diaminofluorenone with anilide couplers, such as the anilides of hydroxy benzocarbazolecarboxylic acids, followed by annealing. The pigments resulting from the processes of the present invention can be selected for layered photoconductive imaging members with improved xerographic properties, inclusive of high charge acceptance, low dark decay, high photosensitivity, including photosensitivity in the wavelength regions of from about 400 to about 800 nanometers, enabling their selection for electrophotographic, especially xerographic imaging systems, LED printers, and diode laser printers which are usually senstive to wavelengths of from about 600 to about 800 nanometers. In one embodiment of the invention of the present application there are provided imaging members with photoconductive layers comprised of the bisazo pigments prepared by the annealing processes illustrated herein, and charge or hole transport layers, especially those comprised of aryl amines, which members are sensitive to light in the wavelength region of from about 400 to about 800 nanometers. The resulting members are responsive to visible light, and near infrared illumination orginating from laser printing apparatuses wherein, for example, gallium arsenide diode lasers are selected. The photoresponsive imaging members of the present invention can also, for example, contain situated between a photogenerating layer and a hole transporting layer, or situated between a photogenerating layer and a supporting substrate with a charge, especially hole, transport layer in contact with the photogenerating layer, a photoconductive composition comprised of the bisazo photogenerating pigments obtained by the processes illustrated herein.

Many processes are known for the preparation of azo photogenerating pigments, such as azotization and coupling, reference U.S. Pat. No. 3,898,084. Examples of aromatic amines selected for the preparation of azo photogenerating pigments include 2,7-diaminofluorenone, and imaging members thereof, reference for example U.S. Pat. Nos. 4,797,337; 4,830,942; 4,822,705; 4,596,754; 4,618,672; 4,618,672; 4,481,271; 4,400,455; 4,390,608; 4,327,178; 4,314,015; 4,299,015; 4,299,896 and 4,551,404.

In U.S. Pat. No. 4,916,039 there are disclosed photoconductors with charge generating pigments comprised of certain azo compounds, reference the formula illustrated in the Abstract of the Disclosure, and in column 3. The aforementioned azo pigments are prepared by the coupling reaction of certain carbazole derivatives of Formula VI, with diazonium salts, reference columns 6 and 7. The coupling reaction is accomplished by dissolving the diazonium salts and a coupler in an organic solvent, such as DMF and DMSO, and adding dropwise thereto an alkaline aqueous solution at a temperature of from about $-10°$ to about $40°$ C., see column 7 for example. A similar coupling reaction is disclosed in U.S. Pat. No. 4,925,758 wherein, for example, there are selected costly couplers as compared to the more economical couplers that may be selected for the processes of the present invention.

In a patentability search report, the following U.S. Pat. Nos. were recited: 4,299,896 which discloses, for example, that disazo pigments can be prepared by first diazotizing 2,7-diaminofloren-9-one and reacting the product with a coupler such as naphthol AS; a similar teaching is present in 4,314,015; and 4,666,810, imaging members with azo pigments prepared subjecting a diazonium salt of the amino groups to aqueous coupling with a corresponding coupler in the presence of an alkali, and the like, see column 3 to 7 for example, and note the synthesis Examples. Imaging members with certain bisazo pigments are known, reference for example U.S. Pat. No. 3,898,084, which discloses, for example, the azo pigment chlorodiane blue in a photoconductive imaging member.

U.S. Pat. No. 3,574,181 discloses disazo compounds useful as coloring agents. Composite electrophotographic photosensitive materials containing various azo compounds are disclosed in U.S. Pat. No. 4,618,672, wherein bisazo compounds particularly suitable for use in the charge generating layer of a layered electrophotographic photoconductor are illustrated. Similarly, an article by M. Hashimoto entitled "Electrophotographic Sensitivity of Fluorenone Bisazo Pigments," Electrophotography, Vol. 25, No. 3 (1986), discloses disazo compounds as charge generating materials in electrophotographic layered photoreceptors. Further, Japanese Patent Kokai No. 54-20736 discloses disazo pigments as constituents in electrophotographic processes. Japanese Patent 58-177955 also discloses many disazo compounds suitable for use in the photosensitive layer of an electrophotographic device.

U.S. Pat. No. 4,713,307, the disclosure of which is hereby totally incorporated by reference, discloses photoconductive imaging members containing a supporting substrate, certain azo pigments as photogenerating materials, and a hole transport layer that preferably contains an aryl diamine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

Additional references illustrating layered organic electrophotographic photoconductor elements with azo, bisazo, and related compounds include U.S. Pat. Nos. 4,390,611, 4,551,404, 4,596,754, Japanese Patent 60-64354, U.S. Pat. Nos. 4,400,455, 4,390,608, 4,327,168, 4,299,896, 4,314,015, 4,486,522, 4,486,519, 4,555,667, 4,440,845, 4,486,800, 4,309,611, 4,418,133, 4,293,628, 4,427,753, 4,495,264, 4,359,513, 3,898,084, 4,830,944, 4,820,602, and Japanese Patent Publication 60-111247.

In U.S. Pat. No. 4,833,052, the disclosure of which is totally incorporated herein by reference, there are illustrated certain bisazo photoconductive imaging members. Examples of bisazo compounds disclosed in this patent include those of the formulas as illustrated in column 4, such as 4,4'-bis(1"-azo-2"-hydroxy-3"-naphthanilide)-1,1'-dianthraquinonylamine.

A number of the azo photogenerating pigments of the aforementioned patents are prepared by known coupling reactions, however, these patents appear to be silent with respect to an annealing process, the invention of the present application, which process enables, for example, the removal of water, in some instances solvents such as DMF, and thus avoiding the problem of the formation of undesirable complexes of water with functional groups present on the photogenerating pigment. With the processes of the present invention, there are also enabled imaging members with photogenerating pigments that possess improved xerographic characteristics, and wherein relatively economical couplers can be selected.

SUMMARY OF THE INVENTION

It is a feature of the present invention to provide certain bisazo compositions and processes for the preparation thereof.

Another feature of the present invention is to provide processes for the preparation of certain bisazo photogenerating pigments, and imaging members thereof, which members can be sensitive to wavelengths of from about 400 to about 800 nanometers.

In another feature of the present invention there are provided improved processes for preparing bisazo photogenerating pigments by annealing, wherein, for example, undesirable components such as water and other polar volatile components are removed, or the amounts thereof present are substantially minimized.

Another feature of the present invention resides in the provision of bisazo photoresponsive imaging members which can possess excellent dark decay properties, high charge acceptance values, and electrical stability.

Further, in another feature of the present invention there are provided photoconductive imaging members that can be simultaneously responsive to infrared light, and to visible light.

Additionally, another feature of the present invention resides in the provision of imaging and printing methods with the photoconductive imaging members illustrated herein.

These and other features of the present invention in embodiments thereof can be accomplished by the provision of processes for the preparation of photogenerating pigments, such as bisazo compounds and imaging members thereof. More specifically, the present invention is directed to processes for the preparation of bisazo photogenerating pigments by the reaction of 2,7-diaminofluorenone and anilide couplers of 2-hydroxy-11H-benzo(a)carbazole-3-carboxylic acid, followed by annealing the resulting product after drying by, for example, heating preferably under a reduced pressure. Annealing can be accomplished by heating at an effective temperature of from about 95° to about 195° C. in embodiments, and wherein the pressure is preferably from about 1.5 to about 2.0 millimeters of mercury. Annealing time depends on a number of factors, however, such a time can be from about 6 hours to about 24 hours.

An embodiment the process of the present invention comprises initially tetrazotizing 2,7-diaminofluorenone with an excess amount, for example from about 2 to about 10, and preferably from about 2 to about 6 equivalents of a metallic nitrite, such as sodium or potassium nitrite, and the like, at a temperature of from about $-10°$ to about 25° C. in an acidic aqueous solution, such as a hydrochloric acid solution, preferably with 18 percent of hydrochloric acid. The tetrazonium salts formed are usually isolated as the fluoroborate of hexafluoroborate salts, wherein the isolation can be accomplished by the addition of from about 2 to about 50, and preferably from about 10 equivalents of $HBF_4$ or $HPF_6$ to the salt solution. Thereafter, the aforementioned salts can be dissoved in a solvent such as dimethyl formamide at 0° to about 30° C., and wherein the resulting mixture is then reacted with 2 equivalents or more of a known anilide coupler, such as 2-hydroxy-11H-benzo(a)carbazole-3-carbox-p-chloroanilide at a temperature of from about 0° to about 30° C.; thereafter, the desired azo pigment can be precipitated out of solution when about 2 equivalents or more of a base, such as sodium acetate was introduced therein. Subsequently, azo pigments can be isolated by filtration, and purified by repetitive solvent washings with water to remove inorganic impurities and DMF to remove any organic impurities. The azo product can then be dried in a vacuum oven at about 70° to about 80° C. at a reduced pressure of, for example, 1.5 to 2.0 millimeters of mercury for about 8 to about 18 hours. There can be obtained the pigment product desired, such as 2,7-bis(1'-azo-2'-hydroxy-11'H-benzo(a)carbazole-3'-carbox-p-chloroanilide)fluorenone as determined by elemental analysis, melting point data, and IR spectroscopy. Thereafter, and primarily for improving the xerographic characteristics of the pigment when incorporated into an imaging member the bisazo photogenerating pigment obtained is further heated, or annealed in, for example, a vacuum oven at a temperature of from about 95° to about 195°, and preferably from about 100° to about 170° C., preferably at a reduced pressure of 2.0 millimeters of mercury for an effective period of time, about 6 to about 18 hours for example. A small quantity of water was removed as determined by the weight loss of the sample and by IR spectroscopy. The resulting bisazo photogenerating pigment exhibits high charge acceptance characteristics, lower dark decay values, higher photosensitivity, and excellent superior electrical stability as compared to the photogenerating pigment prior to annealing. A number of bisazo photogenerating pigments can be obtained by the aforementioned process, including annealing, such as the bisazos of the United States patents mentioned herein, the disclosures of each of these patents being totally incorporated herein by reference. One bisazo obtained with the process of the present invention is 2,7-bis(1'-azo-2'-hydroxy-11'H-benzo(a)-carbazole-3'-carbox-p-chloroanilide)fluorenone.

The bisazo compounds obtained with the annealing processes of the present invention can be incorporated into various photoconductive imaging members. One such member is comprised of a supporting substrate, a hole transport layer, and as a photoconductive layer situated between the supporting substrate, and the hole transport layer the bisazo compounds. In another embodiment, there is envisioned a layered photoresponsive device comprised of a supporting substrate, a photoconductive layer comprised of the bisazo compounds obtained with the processes of the present invention; and situated between the supporting substrate and the photoconductive layer, a hole transport layer. In one specific illustrative embodiment, the photoresponsive device can be comprised of (1) a supporting substrate, (2) a hole blocking layer, (3) an optional adhesive interface layer, (4) a photogenerating layer comprised of the bisazo pigments obtained with the processes of the present invention, and (5) a hole transport layer. Thus, a specific photoresponsive device of the present invention can be comprised of a conductive supporting substrate, a hole blocking metal oxide layer in contact therewith, an adhesive layer, the bisazo fluorenone compound mentioned herein, 2,7-bis(1'-azo-2'-hydroxy-1 1'H-benzo(a)carbazole-3'-carbox-p-chloroanilide)-fluorenone overcoated on the optional adhesive layer, and as a top layer a hole transport layer comprised of certain diamines dispersed in a resinous matrix. The photoconductive layer composition when in contact with the hole transport layer is capable of allowing holes generated by the photogenerating layer to be transported. Examples of aryl amine hole transport molecules that may be selected for the photoconductor devices are illustrated in U.S. Pat. No. 4,265,990, the disclosure of which is totally incorporated herein by reference. Also, examples of charge transport molecules are illustrated in U.S. Pat. No. 4,921,773, and the patents mentioned therein, the disclosures of each of the aforementioned patents, including the '773 patent being totally incorporated herein by reference.

The photoresponsive devices described herein can be incorporated into various imaging systems such as those conventionally known as xerographic imaging processes. Additionally, the imaging members of the present invention can be selected for imaging and printing systems with visible light and/or infrared light. In this embodiment, the photoresponsive devices may be negatively charged, exposed to light in a wavelength of from about 400 to about 800, and preferably from about 400 to about 700 nanometers, either sequentially or simultaneously, followed by developing the resulting image and transferring to paper.

BRIEF DESCRIPTION OF THE FIGURES

For a better understanding of the features of the present invention, the following detailed description of various embodiments is provided wherein.

DESCRIPTION OF SPECIFIC EMBODIMENTS

Specific embodiments of the invention will now be illustrated, it being noted that substantially equivalent imaging members are also embraced within the scope of the present invention.

Figure 1:
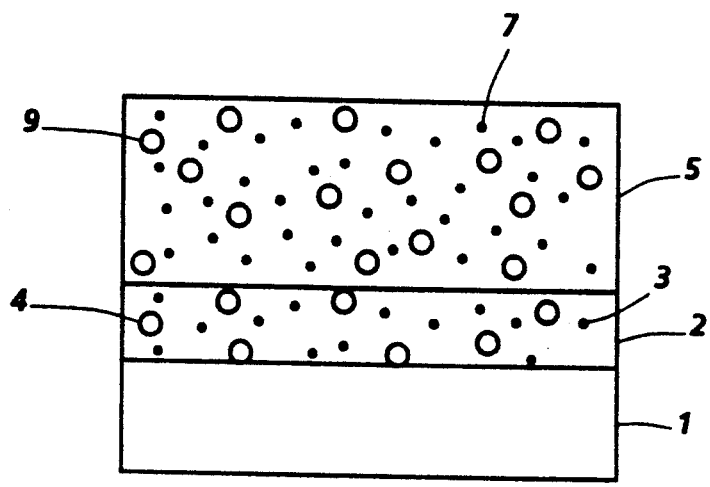
FIGS. 1, 2, and 3 are partially schematic views of examples of photoconductive imaging members of the present invention.

FIG. 1 illustrates a photoconductive imaging member of the present invention comprising a supporting substrate 1, a photogenerating layer 2 comprising the bisazo 3 obtained by the annealing processes disclosed herein optionally dispersed in a resinous binder composition 4, and a charge carrier hole transport layer 5, which comprises hole transporting molecules 7 dispersed in an inactive resinous binder composition 9.

Figure 2:
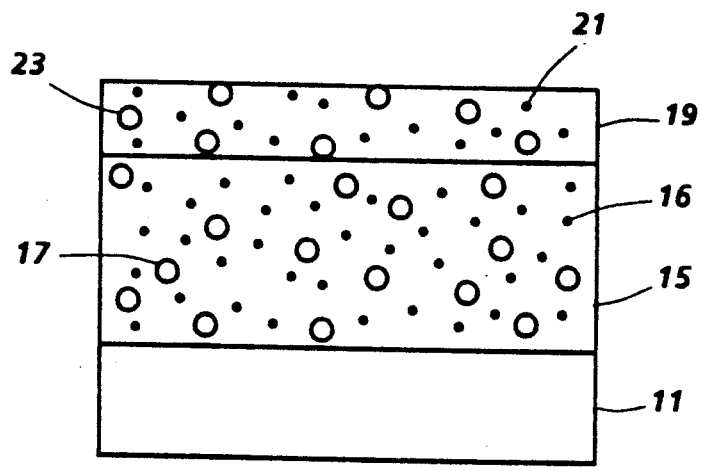

FIG. 2 illustrates the same member as that shown in FIG. 1 with the exception that the hole transport layer is situated between the supporting substrate and the photogenerating layer. More specifically, this figure illustrates a photoconductive imaging member comprising a supporting substrate 11, a hole transport layer 15 comprising aryl amine hole transport molecules 16 dispersed in an inactive resinous binder composition 17, and a photogenerating layer 19 comprising the bisazo compound 21, 2,7-bis(1'-azo-2'-hydroxy-1 1'H-benzo(a)carbazole-3'-carbox-p-chloroanilide)fluorenone obtained by the annealing processes disclosed herein, optionally dispersed in a resinous binder composition 23.

Figure 3:
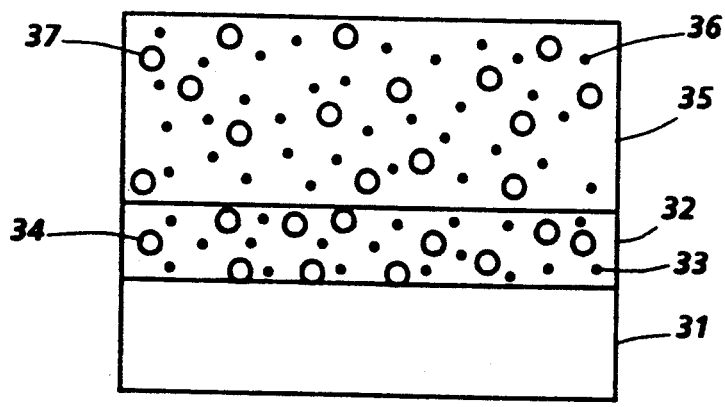

FIG. 3 illustrates a photoconductive imaging member of the present invention comprising a supporting substrate 31, a photogenerating layer 32 comprising the bisazo 33, 2,7-bis(1'-azo-2'-hydroxy-1 1'H-benzo(a)carbazole-3'-carbox-p-chloroanilide)fluorenone obtained by the annealing processes disclosed herein at a temperature of from about 95° to about 195° C., and preferably from about 100° to about 170° C., optionally dispersed in a resinous binder composition 34, and a charge carrier hole transport layer 35 which comprises hole transporting molecules 36, dispersed in an inactive resinous binder composition 37.

The supporting substrate of the imaging members may comprise an insulating material such as an inorganic or organic polymeric material, including MYLAR ®, a commercially available polymer; a layer of an organic or inorganic material having a semiconductive surface layer such as indium tin oxide or aluminum arranged thereon; or a conductive material such as aluminum, titanium, chromium, nickel, brass, or the like. The substrate may be flexible, seamless, or rigid and may have a number of different configurations, such as a plate, a cylindrical drum, a scroll, an endless flexible belt, and the like. In one embodiment, the substrate is in the form of an endless flexible belt. In some situations, it may be desirable to coat an anticurl layer, such as polycarbonate materials commercially available as MAKROLON ®, on the back of the substrate, particularly when the substrate is an organic polymeric material.

The thickness of the substrate layer depends on a number of factors, including economic considerations, the components of the other layers, and the like. Thus, this layer may be of substantial thickness, for example up to 125 mils, or of minimal thickness provided that there are no adverse effects on the system. In embodiments, the thickness of this layer is from about 3 mils to about 20 mils.

Generally, the bisazo photogenerating layer has a thickness of from about 0.05 micron to about 10 microns or more, and preferably has a thickness of from about 0.1 micron to about 4 microns. The thickness of this layer, however, is dependent primarily upon the photogenerating weight loading, which may vary from about 5 to 100 percent, the components of the other layers, and the like. Generally, it is desirable to provide this layer in a thickness sufficient to absorb a substantial amount, for example from about 80 to about 90 percent or more, of the incident radiation which is directed upon it in the imagewise or printing exposure step. The maximum thickness of this layer is dependent primarily upon factors such as mechanical considerations, such as the specific azo pigment selected, the thicknesses of the other layers, and whether a flexible photoconductive imaging member is desired. Optionally, resin binders for the photogeneration layer include poly(vinyl acetal) such as polyvinyl formal, or a polyvinyl butryal, and the like.

The hole transport layer can be comprised of various known components providing, for example, that they effectively transport charges (holes) such as an aryl amine compound dispersed in a resinous binder and other components, reference the '773 patent mentioned herein, the disclosure of which is totally incorporated herein by reference. In one embodiment, the hole transport layers are comprised of aryl amine compounds of the formula:

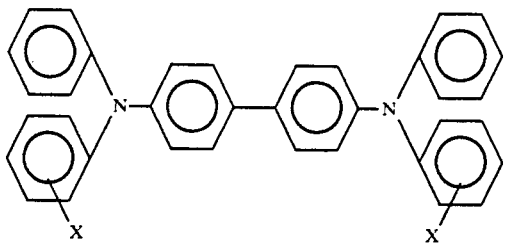

wherein X is selected from the group consisting of alkyl and halogen. Preferably, X is selected from the group consisting of methyl and chloride in either the ortho, meta, or para positions. Suitable inactive binder materials for the hole transport layer include known highly insulating resins, which generally have a resistivity of at least $10^{12}$ ohm-cm to prevent undue dark decay. Compounds corresponding to the above formula include N,N'-diphenyl-N,N'-bis(alkylphenyl)-[1,1'-biphenyl]-4,4'-diamine, wherein alkyl is selected from the group consisting of methyl, such as 2-methyl, 3-methyl and 4-methyl, ethyl, propyl, butyl, hexyl, and the like. With halo substitution, the amine is N,N'-diphenyl-N,N'-bis(-halo phenyl)-[1,1'-biphenyl]-4,4'-diamine, wherein halo is 2-chloro, 3-chloro or 4-chloro. Other electrically active small molecules that can be dispersed in the electrically inactive resin to form a layer which will transport holes include bis(4-diethylamino-2-methylphenyl)-phenyl methane, 4',4''-bis(diethylamino)-2',2''-dimethyltriphenyl methane, bis-4-(diethylaminophenyl)phenyl methane, and 4,4'-bis(diethylamino)-2,2'-dimethyltriphenyl methane. Generally, the hole transport layer has a thickness of from about 5 to about 75 microns, and preferably of from about 10 to about 40 microns.

Examples of highly insulating and transparent resinous components or inactive binder resinous material for the transport layer include materials, such as those described in U.S. Pat. No. 3,121,006, the disclosure of which is totally incorporated herein by reference. Specific examples of suitable organic resinous materials include polycarbonates, arcylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. The materials most preferred as electrically inactive resinous materials in embodiments of the present invention are poly(4,40 -dipropylidinediphenyline carbonate) with a weight average molecular weight of from about 35,000 to about 40,000 available as Lexan TM 145 from General Electric Company; poly(4,4'-isopropylidine-diphenyline carbonate) with a weight average molecular weight of from about 40,000 to about 45,000 available as Lexan 141 from General Electric Company; a polycarbonate resin having a weight average molecular weight of from about 50,000 to about 100,000 available as MAKROLON ® from Farbenfabricken Bayer AG; and a polycarbonate having a weight average molecular weight of from about 20,000 to about 50,000 available as MERLON ® from Mobay Chemical Company. Generally, the resinous binder contains from about 10 to about 75 percent by weight of the active material corresponding to the foregoing formula, and preferably from about 35 percent to about 50 percent of this material. Examples of binder material for the bisazo photogenerating layer are poly(vinyl acetals), polycarbonates as mentioned herein, polyesters, polyvinyl carbazole, and the like. Typical effective amounts of binder can be selected including, for example, from about 5 to about 95 weight percent, and preferably from about 10 to about 70 weight percent, in embodiments of the present invention.

The photoconductive imaging member may optionally contain a hole blocking layer situated between the supporting substrate and the photogenerating layer. This layer may comprise metal oxides, such as aluminum oxide and the like, or materials such as silanes. The primary purpose of this layer is to prevent hole injection from the substrate during and after charging. Typically, this layer is of a thickness of about 5 to about 300 Angstroms, although it may be as thick as 500 Angstroms in some instances.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is, for example, of a thickness of less than about 0.6 micron with a thickness range of from about 0.05 to about 1 micron being suitable in embodiments of the present invention.

Imaging members of the present invention exhibit excellent xerographic properties in embodiments thereof. For example, values for dark development potential ($V_{ddp}$) can range from about $-400$ to about $-975$. Preferred ranges for dark development potential for the imaging members of the present invention are usually about $-400$ to $-900$ volts with $-800$ volts being especially preferred in embodiments. High dark development potentials permit high contrast potentials, which result in images of high quality with essentially no background development.

The imaging members of the present invention in embodiments thereof also exhibit low dark decay values of, for example, about $-50$ volts per second or less. Low dark decay values can be of importance for developing high quality images since dark decay measures the amount of charge that disappears after charging of the photoreceptor, and a large difference in charge between exposed and unexposed areas of the photoreceptor results in images with high contrast. Acceptable values for dark decay vary depending on the design of the imaging apparatus in which the imaging members are contained. This dark decay may be as high as $-100$ volts per second with $-50$ volts, and $-10$ to $-20$ volts per second being preferred in embodiments.

Residual potential values ($V_R$) for the imaging members of the present invention in embodiments thereof are excellent, ranging from, for example, about $-5$ volts to about $-50$ volts. Residual potential is a measure of the amount of charge remaining on the imaging member after erasure by exposure to light and prior to imaging. Residual potentials of $-5$ to $-15$ are considered very exceptional.

Photosensitivity values ($E_{0.5ddp}$ at 600 nanometers) for the imaging members of the present invention in embodiments thereof are acceptable and, in some instances excellent, and can be, for example, from about 4 to about 25 ergs per square centimeter. Acceptable photosensitivity values vary depending on the design of the imaging apparatus in which the imaging members are contained; thus in some instances, values as high as 40 or 50 are acceptable, and values of about 5 can be preferred.

The present invention also encompasses a method of generating images with the photoconductive imaging members disclosed herein. The method comprises the steps of generating an electrostatic image on a photoconductive imaging member of the present invention, subsequently developing the electrostatic image with known developer compositions comprised of resin particles, pigment particles, additives, including charge control agents and carrier particles, reference U.S. Pat. Nos. 4,558,108; 4,560,535; 3,590,000; 4,264,672; 3,900,588; and 3,849,182, the disclosures of each of these patents being totally incorporated herein by reference, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those wherein a corotron or a biased roll is selected. The fixing step may be performed by means of any suitable method, such as flash fusing, heat fusing, pressure fusing, vapor fusing, and the like.

The imaging members of the present invention can be prepared by a number of different known processes such as those illustrated in the U.S. Pat. No. 4,886,722, the disclosure of which is totally incorporated herein by reference. In one process embodiment, the bisazo photogenerator is coated onto a supporting substrate with a Bird applicator, for example, followed by the solution coating of the charge transport layer, and thereafter drying in, for example, an oven.

The following examples are being supplied to further define various species of the present invention, it being noted that these examples are intended to illustrate and not limit the scope of the present invention. Parts and percentages are by weight unless otherwise indicated. Comparative data is also presented.

EXAMPLE I 2,7-Diaminofluorenone, 1.05 grams, 5 millimoles, was stirred in 20 milliliters of 18 percent hydrochloric acid at about 50° to 60° C. for about one hour and then at room temperature, about 25° C. overnight, 18 hours. The yellow dispersion obtained was then cooled to about 0° to 5° C. by an ice water bath. A cold aqueous solution of $NaNO_2$ (1 gram in 2.5 milliliters of water) was then added dropwise in about 15 minutes to the aforementioned yellow dispersion. After the addition of the $NaNO_2$ solution, the resulting mixture was stirred in an ice bath for 30 minutes. A clear dark brown solution resulted. This dark brown solution was filtered by a medium sintered glass funnel into a 250 milliliters precooled filtration flask. Fluoroboric acid, 10 milliliters, was added to the cold filtrate and a yellow precipitate was formed immediately. This mixture of the filtrate and fluoroboric acid was stirred at ice cold temperature for about 30 minutes. The yellow precipitate was collected by filtration. After washing with cold water, cold methanol and ether, the product was air dried for 1 hour, yielding the tetrazonium salt, fluorenone-2,7-tetrazonium bis(tetrafluoroborate) about 1.85 grams.

The above prepared tetrazonium salt was then dissolved in about 40 milliliters of cold DMF solvent inside a 3-neck 1 liter flask surrounded by an ice water bath. A cold DMF solution containing 4.26 grams of the coupler, 2-hydroxy-11H-benzo(a)carbozole-3-carbox-p-chloroanilide, in 250 milliliters of DMF was then added into the salt solution in about 20 minutes. The color of the salt solution changed from orange brown to dark purple. A cold solution of 5 grams of NaOAc in 75 milliliters of water was added slowly into the DMF solution (in 30 minutes). The temperature of the DMF solution was kept below 7° C. during the addition. After the addition was completed, the ice bath was removed and the product mixture was stirred at room temperature overnight. Crude bisazo pigment product was isolated by filtration (fine sintered glass funnel). The crude product was then transferred to a 750 milliliter breaker and was stirred with about 250 milliliters of water at about 81° C. for 2½ hours. The pigment was collected by filtration and was subjected to a second water washing (overnight) in a similar fashion. The pigment was then washed with about 250 milliliters of DMF at about 81° C. for 2½ hours, overnight (18 hours), and then 2½ hours. After the third DMF wash, the pigment product was stirred in 250 milliliters of acetone and then 250 milliliters of ether (2½ hours each) to remove residual high boiling solvents of water and DMF, and the product was then dried inside a vacuum oven at 75° C. at 1.5 to 2.0 millimeters of mercury for 16 hours. A dark blue pigment product, 3.62 grams, about 72 percent yield, which was identified as 2,7-bis(1'-azo-2'-hydroxy-11'H-benzo(a)carbazole-3'-carbox-p-chloroanilide) fluorenone, was obtained.

m.p.: >350° C.

IR(KBr): 3,458 (N—H), 1,723 (C=O) and 1,678 $cm^{-1}$ (amide C=O).

Calculated for $C_{59}H_{34}N_8O_5Cl_2$: C 70.45, H 3.41, N 11.14; Found: 69.27, 3.41, 10.46.

A layered photoresponsive imaging member with the above prepared photogenerating pigment was prepared as follows:

To a 1 ounce amber bottle there were added 52.8 milligrams of polyvinyl formal (obtained from Scientific Polymer Products, Inc., formal content 82 percent, acetate content 12 percent, hydroxy content 6 percent) and 10 milliliters of tetrahydrofuran. To the bottle was then added 211.2 milligrams of the bisazo pigment 2,7-bis(1'-azo-2'-hydroxy-11'H-benzo(a)carbazole-3'-carbox-p-chloroanilide) fluorenone, without annealing, and about 90 grams of steel shot (⅛ inch diameter, number 302 stainless steel shot). The bottle was then placed on a Red Devil Paint Conditioner (Model 5100×) and shaken for about 30 minutes. The resulting dispersion was coated onto a 7.5 inch by 10 inch brush-grained aluminum substrate obtained from Ron Ink Company using a Gardner Mechanical Drive with a 6 inch wide Bird Film Applicator (0.5 mil wet gap) inside a humidity controlled glove box. The relative humidity of the glove box was controlled by dry air to about 25 percent, or less. The resulting charge generator layer was air dried for about 30 minutes and then vacuum dried for about 1 hour at 100° C. The thickness of the charge generator layer was about 0.5 micron as estimated from TEM micrographs.

The above charge generator layer was overcoated with a hole transport layer comprised of 60 weight percent of the polycarbonate MAKROLON ® obtained from Larkensabricken Bayer AG, and 40 percent of aryl diamine hole transport molecules prepared as follows. A solution containing 4.2 grams of MAK- ROLON ®, a polycarbonate resin obtained from Larbensabricken Bayer A.G., 2.8 grams of N,N'-bis(3''-methylphenyl)-1,1'-biphenyl-4,4'-diamine prepared as disclosed in U.S. Pat. No. 4,265,990, the disclosure of which is totally incorporated herein by reference, was prepared by dissolving the above materials in 31 milliliters of methylene chloride inside a 2 ounce amber bottle. The transport layer was obtained by coating the solution onto the charge generator layer using a 3.5 inch wide, 5 mil wet gap Bird Film Applicator, resulting in a transport layer about 27 microns thick. The resulting photoconductive device was air dried for about 1 hour and vacuum dried at 100° C. for about 16 hours before evaluation on a flat plate imaging test fixture. More specifically, the imaging member thus prepared was evaluated as follows. Xerographic measurements were made on a flat plate scanner using 2 inch by 2.5 inch samples of the imaging member prepared as described herein. The surface potential of the device was monitored with a capacitively coupled ring probe connected to a Keithley electrometer (Model 610C) in the Coulomb mode. The output of the electrometer was displayed on a strip-chart recorder (HP Model 740A) which was calibrated by applying known voltage on an uncoated aluminum substrate. The exposure wavelength and the intensity were selected and adjusted using interference and neutral density filters, respectively. With the shutter closed, the dark decay was measured. With the shutter open, the photosensitivity at a known light exposure was recorded. The imaging member was charged to about $-1,000$ volts at the peak voltage and was allowed to discharge in the dark for 2 to 3 seconds to determine the dark decay. Subsequently, the imaging member was exposed to an erase lamp to photodischarge the surface charge and to determine its residual voltage ($V_R$). Thereafter, the imaging member was charged in a similar manner and exposed to monochromatic radiation at the dark development potential, and the sensitivity of the member was determined in terms of $E_{\frac{1}{2}}$, which represents the energy required to discharge half of the dark development potential. The imaging member exhibited a maximum charge acceptance in volts of $-500$, a $V_{ddp}$ in volts of less than 500 volts, and a dark decay in volts/second of $-165$.

EXAMPLE II

There was prepared a photoresponsive imaging member containing as the photoconductive material the bisazo as prepared in accordance with Example I with the exception that after the vacuum drying of the pigment was accomplished at 75° C. at 2 millimeters of mercury; the resulting bisazo pigment was further annealed for 16 hours in the vacuum oven at 135° C. at a reduced pressure of 1.5 to 3.0 millimeters of mercury. A weight loss of about 1.4 percent (water removal) was measured. An imaging member was then prepared with the aforementioned pigment by repeating the procedure of Example I with the following results. Maximum charge acceptance in volts about $-1,000$; $V_{ddp}$ in volts $-900$; dark decay in volts/second $-65$; $E_{\frac{1}{2}}$ (ergs/cm$^2$) at 450 nanometers 5.1; at 520 nanometers 5.8; at 600 nanometers 5.6; at 650 nanometers 5.8; at 700 nanometers 5.9; at 750 nanometers 5.5; at 760 nanometers 5.6; at 790 nanometers 7.5 and at 800 nanometers 9.1.

EXAMPLE III

The procedures of Example II were repeated with the exception that the further annealing was accomplished at 165° C. instead of 135° C. The imaging member had the following characteristics: maximum charge acceptance in volts about $-1,000$; $V_{ddp}$ in volts $-890$; dark decay in volts/second $-54$; $E_{\frac{1}{2}}$ (ergs/cm$^2$) at 450 nanometers 6.9; at 520 nanometers 7.4; at 600 nanometers 7.0; at 650 nanometers 6.9; at 700 nanometers 7.2; at 750 nanometers 6.6; at 760 nanometers 6.4; at 790 nanometers 8.6 and at 800 nanometers 11.2.

EXAMPLE IV

The procedures of Example II were repeated with the exception that the further annealing was accomplished at 100° C. instead of 135° C. The imaging member had the following characteristics: maximum charge acceptance in volts about $-1,000$; $V_{ddp}$ in volts $-900$; dark decay in volts/second $-60$; $E_{\frac{1}{2}}$ (ergs/cm$^2$) at 450 nanometers 5.7; at 520 nanometers 6.5; at 600 nanometers 6.3; at 650 nanometers 6.5; at 700 nanometers 6.6; at 750 nanometers 6.2; at 760 nanometers 6.3; at 790 nanometers 8.4 and at 800 nanometers 10.5.

Other modifications of the present invention will occur to those skilled in the art subsequent to a review of the present application. These modifications, and equivalents thereof are intended to be included within the scope of this invention.

What is claimed is:

1. A process for the preparation of bisazo photogenerating pigments which comprises the reaction of a diaminofluorenone with potassium nitrite or sodium nitrite, an acid solution, and a tetrafluoroborate; thereafter reacting the resulting tetrazonium salt product with an anilide coupler in a dimethyl formamide solvent containing an aqueous sodium acetate or sodium nitrate solution; recovering and subsequently drying the product by heating; thereafter cooling; and subsequently annealing the product obtained, which annealing is accomplished by heating in a vacuum said product to remove the dimethyl formamide and water, and which heating is accomplished at a temperature of from between about 95° to about 195° C.

2. A process for the preparation of bisazo photogenerating pigments which consists essentially of the reaction of diaminofluorenone with sodium nitrite, hydrochloric acid, and fluoroboric acid; thereafter reacting the resulting tetrazonium salt produce with an anilide coupler in a dimethyl formamide solvent containing an aqueous sodium acetate solution; recovering and subsequently drying the product by heating; thereafter cooling said product; and subsequently annealing the product obtained, which annealing is accomplished by heating said product in a vacuum at a temperature of from between about 95 to about 195° C. to remove the dimethyl formamide solvent and water.

3. A process for the preparation of bisazo photogenerating pigments which consists essentially of the reaction of diaminofluorenone with sodium nitrite, hydrochloric acid, and fluoroboric acid; thereafter isolating and reacting the resulting tetrazonium salt product with an anilide coupler in a dimethyl formamide solvent containing an aqueous sodium acetate solution; recovering and subsequently drying the product by heating at a temperature of from about 70° to about 80° C.; thereafter cooling said product; and subsequently annealing the product obtained by the heating thereof in a vacuum at a temperature of from about 95° to about 195° C. to remove said dimethyl formamide and water.

4. A process in accordance with claim 3 wherein the coupler is 2-hydroxy-11H-benzo(a)carbazole-3-carbox-p-chloroanilide.

5. A process in accordance with claim 3 wherein the diaminofluorenone is 2,7-diaminofluorenone.

6. A process in accordance with claim 1 wherein the water which forms a complex with said photogenerating pigment is removed therefrom by said annealing, which water is derived from the acqueous sodium acetate or sodium nitrate solution and/or the acid solution.

7. A process in accordance with claim 1 wherein the diaminofluorenone is 2,7-diaminofluorenone.

8. A process in accordance with claim 1 wherein the nitrite is sodium nitrite.

9. A process in accordance with claim 1 wherein the nitrite is present in an amount of from about 2 to about 10 equivalents.

10. A process in accordance with claim 1 wherein the nitrite is reacted at a temperature of from about −10° to about 25° C.

11. A process in accordance with claim 1 wherein the nitrite is reacted at a temperature of from about −10° to about 25° C. in a hydrochloric acid solution.

12. A process in accordance with claim 1 wherein the drying of the bisazo is accomplished by heating at a temperature of from about 70° to about 80° C. at a reduced pressure of from about 1.5 to about 2.0 millimeters of mercury.

13. A process in accordance with claim 1 wherein the coupler is 2-hydroxy-11H-benzo(a)carbazole-3-carbox-p-chloroanilide.

14. A process in accordance with claim 1 wherein the bisazo product is 2,7-bis(1'-azo-2'-hydroxy-11'H-benzo(a)carbazole-3'-carbox-p-chloroanilide)fluorenone.

15. A process in accordance with claim 2 wherein the annealing heating is accomplished at a temperature of from about 100° to about 170° C. at a reduced pressure of 2 millimeters of mercury.

16. A process in accordance with claim 2 wherein the annealing heating is accomplished for a period of from about 6 to about 18 hours.

17. A process in accordance with claim 2 wherein the annealing heating is accomplished for a period of from about 6 to about 18 hours.

18. A process in accordance with claim 1 wherein the product is vacuum dried at 75° C.

19. A process in accordance with claim 18 wherein the vacuum drying is accomplished at 2 millimeters of mercury.

20. A process in accordance with claim 2 wherein the product is vacuum dried at 75° C.

21. A process in accordance with claim 20 wherein the vacuum drying is accomplished at 2 millimeters of mercury.

22. A process in accordance with claim 1 wherein the annealing is accomplished at a temperature of from between about 100° to about 170° C.

23. A process in accordance with claim 2 wherein the annealing is accomplished at a temperature of from between about 100° to about 170° C.

24. A process in accordance with claim 1 wherein the heating for drying said product is accomplished at a temperature of from about 70° to about 80° C.

25. A process in accordance with claim 1 wherein drying the product by heating is accomplished at a temperature of 75° C., and the annealing was accomplished at 135° C. at a reduced pressure of 1.5 to 3.0 milliliters of mercury.

26. A process in accordance with claim 1 wherein drying the product by heating is accomplished at 75° C., and annealing is accomplished at 135° at a reduced pressure of 1.5 to 3.0 milliliters of mercury.

* * * * *